United States Patent
Hou et al.

(10) Patent No.: US 7,566,145 B2
(45) Date of Patent: Jul. 28, 2009

(54) DIRECT TYPE ILLUMINATING DEVICE

(75) Inventors: Teng-Chao Hou, Hsinchu (TW);
Tzeng-Ke Shiau, Hsinchu (TW);
Wen-Bin Chou, Hsinchu (TW);
Ching-Shiang Li, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 11/823,744

(22) Filed: Jun. 28, 2007

(65) Prior Publication Data
US 2008/0025029 A1 Jan. 31, 2008

(30) Foreign Application Priority Data
Jul. 25, 2006 (TW) .............. 95127082 A

(51) Int. Cl.
*F21V 5/00* (2006.01)
(52) U.S. Cl. ............ 362/246; 362/223; 362/308; 362/330; 362/558; 362/561; 349/61; 349/62; 349/64; 349/70
(58) Field of Classification Search ......... 362/223, 362/246, 260, 308, 311, 330, 558, 560, 561, 362/511; 349/61, 62, 64, 70
See application file for complete search history.

(56) References Cited
U.S. PATENT DOCUMENTS 6,473,554 B1 * 10/2002 Pelka et al. .............. 385/146
7,168,819 B2    1/2007 Yen ......................... 362/29
7,393,123 B2 *  7/2008 Kasian et al. ............ 362/311
2004/0042194 A1 * 3/2004 Hsieh ........................ 362/31
2005/0219836 A1 10/2005 Hung ......................... 362/97
2005/0248939 A1 11/2005 Li et al. .................... 362/225
2006/0133092 A1  6/2006 Yen ......................... 362/330

FOREIGN PATENT DOCUMENTS
TW    583472 B    4/2004

* cited by examiner

Primary Examiner—Sharon E Payne
Assistant Examiner—Mary Zettl
(74) *Attorney, Agent, or Firm*—Ohlandt, Greeley, Ruggiero & Perle, L.L.P.

(57) ABSTRACT

A direct type illuminating device includes a light source unit, a reflector plate, a diffuser plate, and a lens module. The light source unit provides source light beams. The reflector plate and the diffuser plate are spaced at an interval from each other, and the light source unit is interposed between the reflector plate and the diffuser plate. The lens module surrounds the light source unit such that the lens module is interposed between the light source unit and the reflector and diffuser plates. An outer curved surface of the lens module has a radius of curvature different from a radius of curvature of an outer curved surface of the light source unit such that the source light beams provided by the light source unit are refracted by the lens module to result in change of traveling directions of the source light beams.

12 Claims, 5 Drawing Sheets

DIRECT TYPE ILLUMINATING DEVICE

CROSS-REFERENCE TO RELATED APPLICATION

This application claims priority of Taiwanese Application No. 095127082, filed on Jul. 25, 2006.

BACKGROUND OF THE INVENTION

1. Field of the Invention

The invention relates to an illuminating device, more particularly to a direct type illuminating device.

2. Description of the Related Art

Backlight modules are used as illuminating light source devices for liquid crystal displays. Therefore, distribution of the illumination intensity of the backlight module needs to be uniform for the liquid crystal display to have a fine image quality.

As shown in FIG. 1, a conventional direct type backlight module 11 includes a reflector plate 111, a diffuser plate 112 and a plurality of light source units 113 arranged at intervals between the reflector plate 111 and the diffuser plate 112. The light source units 113 provide source light beams that illuminate toward the reflector plate 111 and the diffuser plate 112. The reflector plate 111 assists in directing most of the source light beams toward the diffuser plate 112. Generally, the diffuser plate 112 is made by injection molding a highly transmissive material blended with microscopic scattering particles. The highly transmissive material can be polycarbonate (PC) or polyethylene terephthalate (PET). The source light beams are diffused by the scattering particles and are uniformed when passed through the diffuser plate 112.

In order to make sure that the illumination intensities of the source light beams provided by the light source units 113 on the diffuser plate 112 are uniformly distributed (as illustrated by curve (A) in FIG. 2), cooperation between the distance (H) between the diffuser plate 112 and the reflector plate 111 and the distance (L) between adjacent light source units 113 is required. For the purpose of saving space, the distance (H) between the diffuser plate 112 and the reflector plate 111 needs to be kept small. If the distance (L) between adjacent light source units 113 is kept constant, while the distance (H) between the diffuser plate 112 and the reflector plate 111 is reduced, then the illumination intensity on the diffuser plate 112 would be unevenly distributed (as illustrated by curve (B) in FIG. 2).

Therefore, when the distance (H) between the diffuser plate 112 and the reflector plate 111 is reduced, the distance (L) between adjacent light source units 113 needs to be decreased as well such that the Gaussian-shaped illumination intensity distributions of the source light beams provided by adjacent light source units 113 on the diffuser plate 112 have enough overlapped areas so as to ensure an overall uniform distribution of illumination intensity on the diffuser plate 112. However, decrease of the distance (L) between adjacent light source units 113 also means an increase in the number of light source units 113 needed in the conventional direct type backlight module 11, which results in an increase in the number of passive elements, such as direct current alternating current inverters (DC-AC inverters) (not shown), necessary for operation of the light source units 113. Consequently, the fabrication cost of the conventional direct type backlight module 11 is increased.

Several conventional methods for improving the distribution of illumination intensity while reducing the thickness of the backlight module (i.e., the distance between the diffuser plate and the reflector plate) are provided hereinbelow. Referring to FIG. 3, U.S. Patent Publication No. 2005/0248939 A1 discloses a lens-arrayed backlight module 13, which utilizes a plurality of lens plates 133 to change the path direction of source light beams provided by light source units 132 and traveling away from housing plates 131. As a result, the Gaussian-shaped illumination intensity distribution of the source light beams provided by individual light source units 132 and traveling away from the housing plates 131 is relatively smooth, and consequently, the illumination intensity distribution of the lens-arrayed backlight module 13 is kept uniform while the thickness thereof is reduced. Referring to FIG. 4, U.S. Patent Publication No. 2006/0133092 A1 discloses a backlight module 14 including a plurality of light diffusing devices 146, each of which is disposed above a respective light source unit 145 so as to change path direction of source light beams provided by the light source units 145 and traveling away from a reflector plate 142 such that the illumination intensity distribution on a top plate 143 is uniform. However, since the lens plates 133 or the light diffusing devices 146 of the abovementioned backlight modules 13, 14 are disposed only at one side of the light source units 132, 145, the source light beams traveling toward the housing 131 or the reflector plate 142 are still not modulated. As a result, the effect of providing a uniform illumination intensity distribution is limited, and the reduction in thickness of the backlight modules 13, 14 is also limited.

Further, referring to FIG. 5, Taiwanese Patent No. 200877 discloses an illuminating device 15 utilizing light bulbs 154, each of which is confined in a cavity of a respective light diffuser 153 such that light beams provided by the light bulbs 154 are scattered and path directions thereof are changed. However, this method only provides that the light beams are scattered randomly, and is therefore not a systematic way of modulating the light beams. Consequently, control over the illumination intensity distribution of the illuminating device 15 is relatively difficult.

SUMMARY OF THE INVENTION

Therefore, the object of the present invention is to provide a direct type illuminating device having a reduced thickness and a reduced number of light source units so as to reduce cost and save space while maintaining a uniform distribution of illumination intensity.

According to one aspect of the present invention, a direct type illuminating device including a reflector plate, a diffuser plate, at least a light source unit, and at least a lens module is provided. The light source unit provides source light beams. The reflector plate and the diffuser plate are spaced at an interval from each other, and the light source unit is interposed between the reflector plate and the diffuser plate. The lens module surrounds the light source unit such that the lens module is interposed between the light source unit and the reflector and diffuser plates. An outer curved surface of the lens module has a radius of curvature different from a radius of curvature of an outer curved surface of the light source unit, whereby the source light beams provided by the light source unit are refracted by the lens module to result in change of traveling directions of the source light beams.

According to another aspect of the present invention, a direct type illuminating device including a reflector plate, a diffuser plate, at least a light source unit, and at least a lens module is provided. The light source unit provides source light beams. The reflector plate and the diffuser plate are spaced at an interval from each other, and the light source unit is interposed between the reflector plate and the diffuser plate.

The lens module surrounds the light source unit such that the lens module is interposed between the light source unit and the reflector and diffuser plates. The outer curved surface of the lens module has a plurality of different radiuses of curvature, whereby the source light beams provided by the light source unit are refracted by the lens module to result in change of traveling directions of the source light beams.

According to yet another aspect of the present invention, a direct type illuminating device including a reflector plate, a diffuser plate, at least a light source unit, and at least a lens module is provided. The light source unit provides source light beams. The reflector plate and the diffuser plate are spaced at an interval from each other, and the light source unit is interposed between the reflector plate and the diffuser plate. The lens module surrounds the light source unit such that the lens module is interposed between the light source unit and the reflector and diffuser plates. The lens module has an outer curved surface with a center of curvature which is non-coincident with that of an outer curved surface of the light source unit, whereby the source light beams provided by the light source unit are refracted by the lens module to result in change of traveling directions of the source light beams.

According to the present invention, since a lens module surrounding a light source unit is provided so as to refract the source light beams provided by the light source unit, Gaussian-shaped illumination intensity distributions on the diffuser plate and on the reflector plate become smoother. In the case of the direct type illuminating device having a plurality of the light source units, since the Gaussian-shaped illumination intensity distributions for each adjacent pair of light source units are smoother, enough overlapped areas therebetween is provided. Consequently, the overall illumination intensity distribution, which is formed by overlapping all distributions contributed by the source light beams traveling directly toward the diffuser plate and reflected by the reflector plate, is uniform, such that the thickness of the direct type illuminating device is reduced and such that the distance between adjacent light source units is increased, thereby reducing the number of light source units and achieving the purpose of reducing the fabrication cost of the direct type illuminating device.

Other objectives, features and advantages of the present invention will be further understood from the further technology features disclosed by the present invention wherein there are shown and described preferred embodiments of this invention, simply by way of illustration of modes best suited to carry out the invention.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. In this regard, directional terminology, such as "upper," "lower," "right," "left," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Accordingly, the drawings and descriptions will be regarded as illustrative in nature and not as restrictive.

Figure 1:
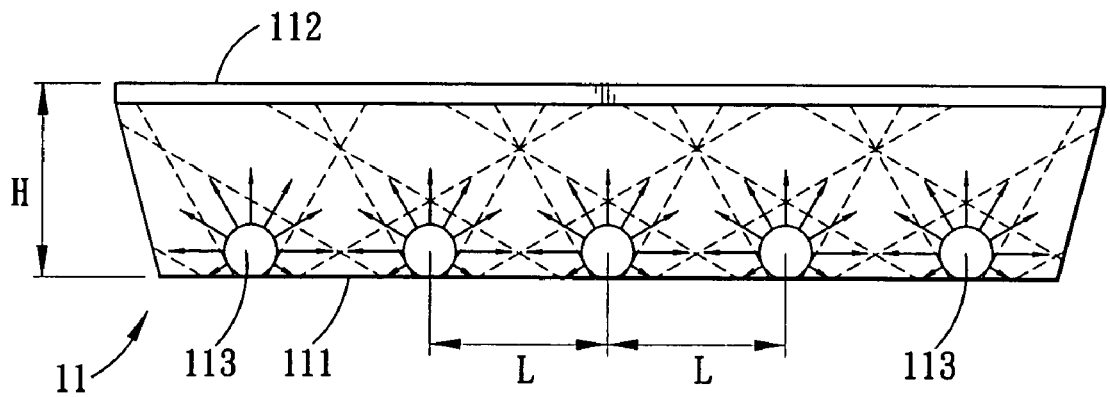
FIG. 1 is a schematic diagram of a conventional direct type illuminating device.
Figure 2:
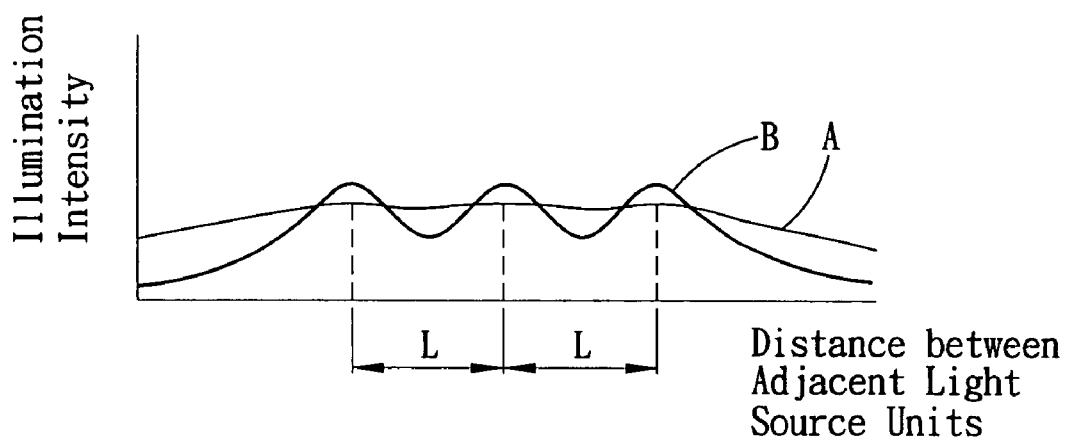
FIG. 2 is a graph illustrating illumination intensity distribution on a diffuser plate of the conventional direct type illuminating device.
Figure 3:
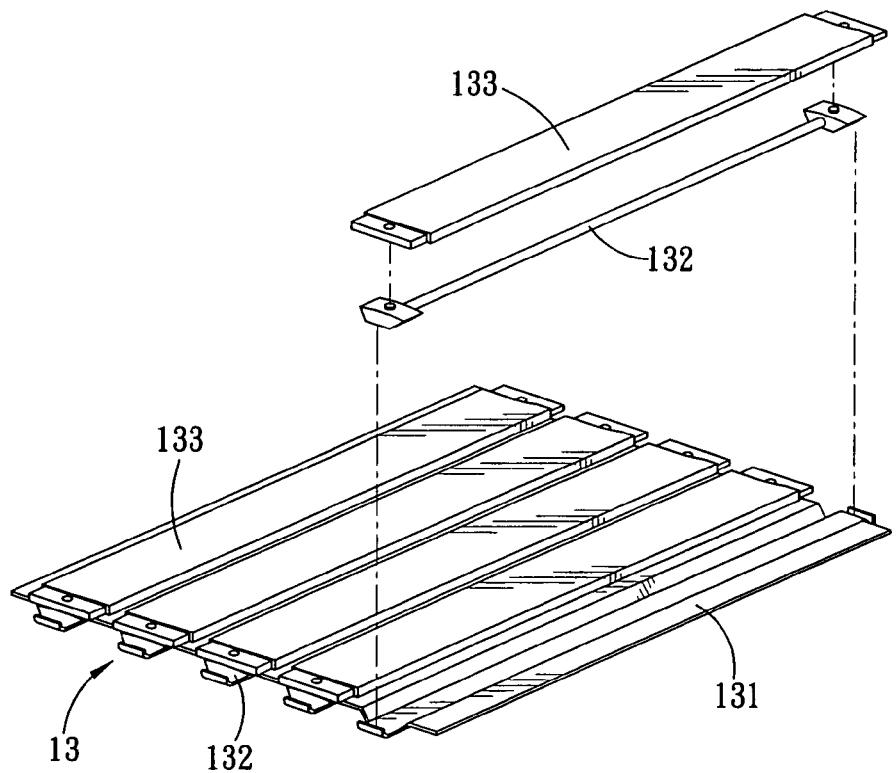
FIG. 3 is a partly exploded perspective view of a lens-arrayed backlight module according to U.S. Patent Publication No. 2005/0248939 A1.
Figure 4:
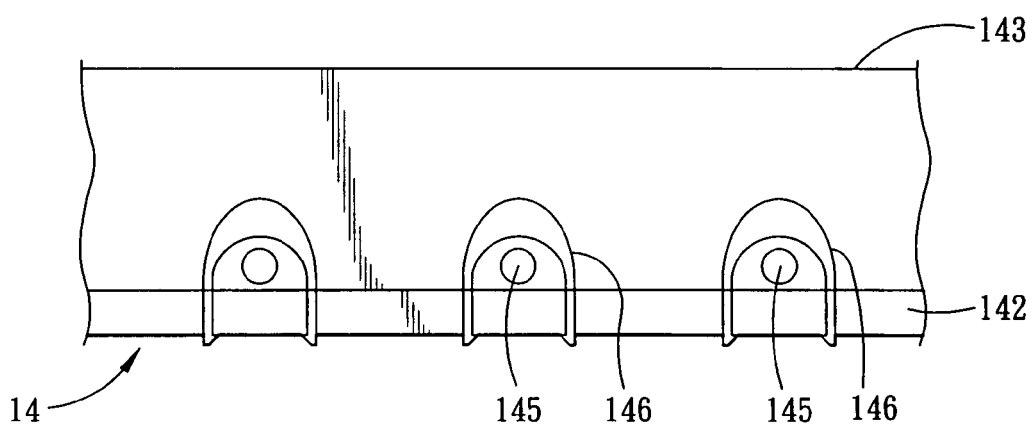
FIG. 4 is a schematic diagram of a backlight module according to U.S. Patent Publication No. 2006/0133092 A1.
Figure 5:
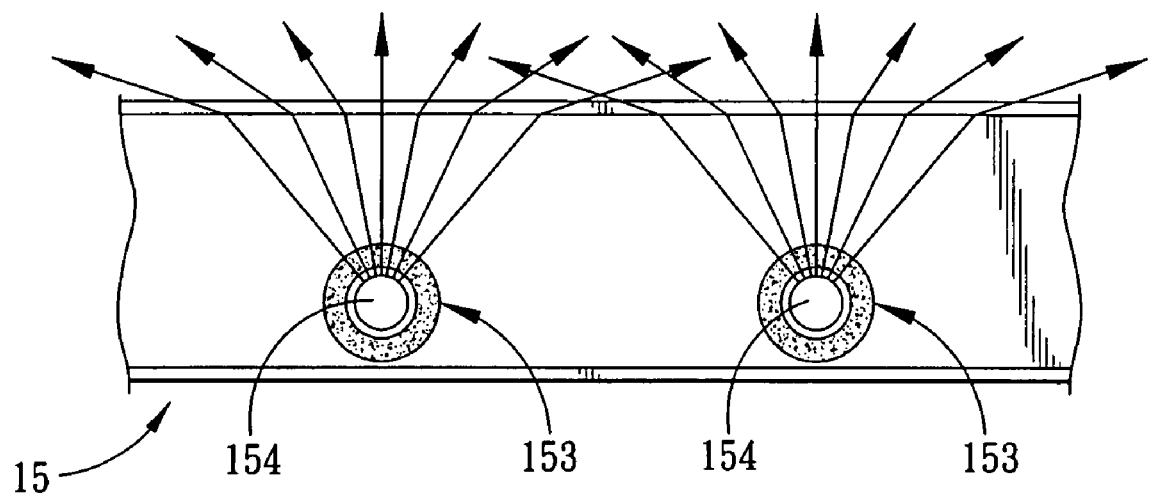
FIG. 5 is a schematic diagram of an illuminating device according to Taiwanese Patent No. 200877.
Figure 6:
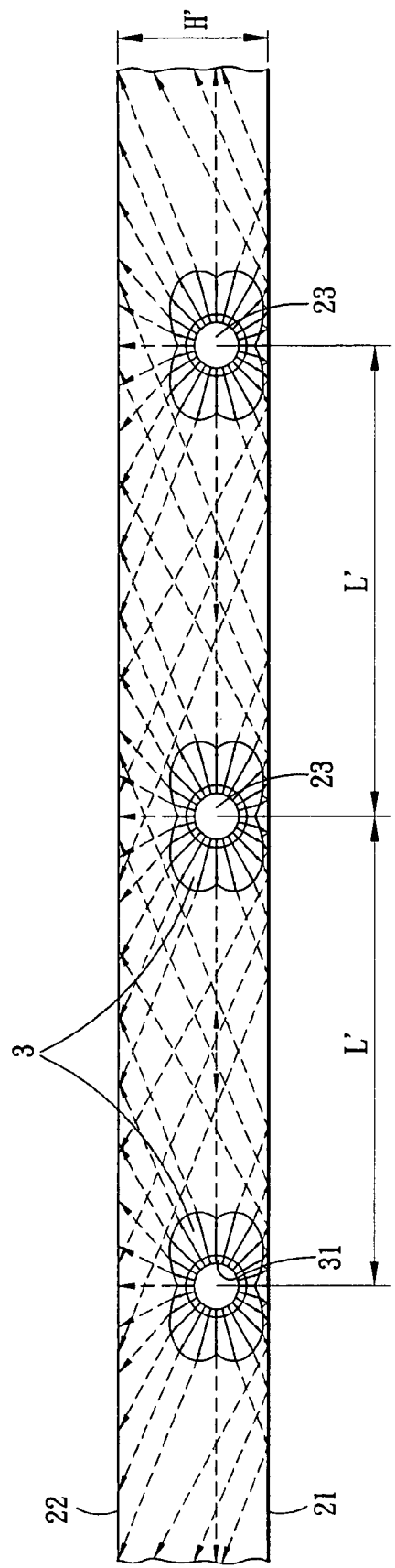
FIG. 6 is a schematic diagram of a preferred embodiment of a direct type illuminating device according to the present invention.

As shown in FIG. 6, a preferred embodiment of a direct type illuminating device according to the present invention includes a plurality of light source units 23, a reflector plate 21, a diffuser plate 22, and a plurality of lens modules 3. The light source units 23 provide source light beams. The reflector plate 21 and the diffuser plate 22 are spaced at an interval and are disposed in a parallel arrangement, and the light source units 23 are arranged at intervals between the reflector plate 21 and the diffuser plate 22. A portion of the source light beams travel directly toward the diffuser plate 22, while the rest of the source light beams are reflected by the reflector plate 21 before traveling towards the diffuser plate 22, thereby ensuring that most of the source light beams reach the diffuser plate 22 so as to increase the usage efficiency of the light source units 23.

Each of the lens modules 3 is made from a highly transmissive material, and surrounds a respective one of the light source units 23 such that the lens module 3 is interposed between the respective one of the light source units 23 and the reflector and diffuser plates 21, 22. The lens modules 3 are arranged at intervals between the reflector plate 111 and the diffuser plate 112 and are spaced at an interval from the reflector and diffuser plates 21, 22. The outer curved surface of each the lens modules has a plurality of different radiuses of curvature, whereby the source light beams provided by the light source units are refracted by the lens modules to result in change of traveling directions of the source light beams. The outer curved surface of each of the lens modules 3 has at least a radius of curvature which is non-coincident with that of an outer curved surface of the respective one of the light source units 23, whereby the source light beams provided by the light source units are refracted by the lens module to result in change of the traveling directions of the source light beams.

In other embodiment, each of the lens modules 3 has an outer curved surface with a center of curvature which is non-coincident with that of an outer curved surface of the respective one of the light source units 23 whereby the source light beams provided by the light source units 23 are refracted by the lens modules 3 to result in change of the traveling directions of the source light beams. In other embodiment, the outer curved surface of each of the lens modules 3 is a non-circular or a non-second-order-curve outer curved surface and has a non-fixed radius of curvature.

In this embodiment, each of the light source units 23 is a tubular linear lamp, which can be a cold cathode fluorescent lamp (CCFL). Each of the lens modules 3 has a cavity 31 that extends in a direction along the length of the respective one of the light source units 23 for receiving the respective one of the light source units 23 therein. The cavity 31 is a columnar space that corresponds to the outer curved surface of the respective one of the light source units 23, but is not limited thereto. The cavity 31 can have any other shape such that an inner surface of the lens module 3 has a curvature coincident with that of the outer curved surface of the respective one of the light source units 23 according to other embodiments of the present invention.

In this embodiment, refractive indices of the lens modules 3 are substantially equivalent to each other, and each of the lens modules 3 surrounds and is spaced apart from the respective one of the light source units 23. However, the refractive indices of the lens modules 3 can also be different from each other, and the lens modules 3 can be in physical contact with the light source units 23, respectively, according to other embodiments of the present invention. In addition, the number of the light source units 23 and the number of the lens modules 3 can both be one according to other embodiments of the present invention.

In this embodiment, each of the lens modules 3 has left and right parts that are symmetrical to each other, and upper and lower parts that are also symmetrical to each other. The outer curved surface of each of the lens modules 3 can be divided into an upper-right part, an upper-left part, a lower-right part and a lower-left part that protrude outwardly and that are arc-shaped. The curvature of the outer curved surface is discontinuous at a junction of the left and right parts of the lens module, and the curvature of the outer curved surface is discontinuous at a junction of the upper and lower parts of the lens module. It is noted herein that the particular shape of each of the lens modules 3 is only provided as an example, and should not be limited thereto.

According to the present invention, the lens modules 3 refract the source light beams that will fall on the reflector and diffuser plates 21, 22 and change the traveling directions thereof such that the range on the reflector and diffuser plates 21, 22 where the source light beams fall is increased. Further, by appropriately adjusting the radius of curvature of the outer curved surface of each of the lens modules 3, the source light beams can be properly modulated, and therefore it is easier to control the illumination intensity distribution to be uniform, and to control the illumination intensity distributions of the source light beams on the reflector and diffuser plates 21, 22 to have smoother Gaussian shapes. Consequently, although the distance (L') between adjacent light source units 23 is increased to approximately 1.2 times of that without the presence of the lens modules 3, there is still enough overlapped areas between the Gaussian-shaped illumination intensity distributions such that the overall illumination intensity distribution, which is formed by overlapping all distributions contributed by the source light beams traveling directly toward the diffuser plate and reflected by the reflector plate, can be kept uniform. As a result, the number of passive elements, such as DC-AC inverters (not shown), necessary for operation of the light source units 23 and the number of the light source units 23 can also be reduced to cut down the fabrication cost of the direct type illuminating device. Moreover, since the Gaussian-shaped illumination intensity distributions of the source light beams on the reflector and diffuser plates 21, 22 have smoother Gaussian shapes, the distance (H') between the reflector and diffuser plates 21, 22, and in turn the thickness of the direct type illuminating device, can be reduced to half or more of that without the presence of the lens modules 3.

Figure 7:
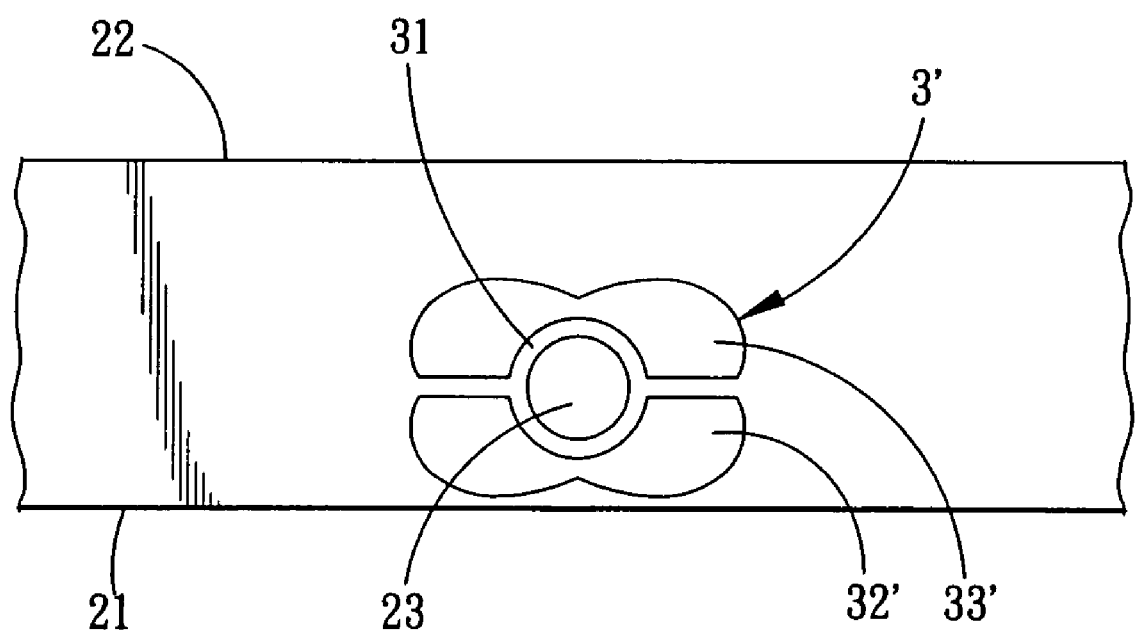
FIG. 7 is a schematic diagram illustrating a lens module having plurality of lens plates according to a preferred embodiment of the present invention.

In this embodiment, each of the lens modules 3 is formed integrally to surround the respective one of the light source units 23. However, each of the lens modules 3 can include a plurality of lens plates that cooperate with each other to define the cavity 31 for receiving the respective one of the light source units 23 therein. As illustrated in FIG. 7, each of the lens modules 3' includes first and second lens plates 32', 33' that are spaced apart from each other and that cooperate with each other to define the cavity 31 for receiving the respective one of the light source units 23 therein. However, the first and second lens plates 32', 33' can also be in physical contact with each other.

In sum, according to the present invention, the direct type illuminating device is provided with lens modules 3, each of which surrounds a respective one of the light source units 23. The source light beams provided by the light source units 23 are refracted by the lens modules 3 so as to increase the ranges on the reflector and diffuser plates 21, 22 where the source light beams fall such that the Gaussian-shaped illumination intensity distributions of the source light beams on the reflector and diffuser plates 21, 22 have smoother Gaussian shapes. As a result, the distance (L') between adjacent light source units 23 can be increased in order to reduce the number of the light source units 23 and passive elements necessary for operation of the light source units 23 included in the direct type illuminating device to thereby reduce the fabrication cost thereof. Further, the thickness of the direct type illuminating device is also reduced for the purpose of saving space. Since the Gaussian-shaped illumination intensity distributions for each two adjacent light source units 23 are smoother to provide enough overlapped areas therebetween such that the overall illumination intensity distribution, which is formed by overlapping all distributions contributed by the source light beams traveling directly toward the diffuser plate 22 and reflected by the reflector plate 21, is uniform, the advantages of the present invention can be realized.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A direct type illuminating device comprising:
   a reflector plate;
   a diffuser plate spaced at an interval from said reflector plate;
   at least a light source unit providing source light beams and interposed between said reflector plate and said diffuser plate; and
   at least a lens module surrounding said light source unit and located between said reflector plate and said diffuser plate, an outer curved surface of said lens module having a radius of curvature different from a radius of curvature of an outer curved surface of said light source unit, wherein said outer curved surface of said lens module has a center of curvature which is non-coincident with that of said outer curved surface of said light source unit;
   wherein said lens module has left and right parts that are symmetrical to each other, and the curvature of said outer curved surface of said lens module is discontinuous at a junction of said left and right parts of said lens module;
   wherein said lens module has upper and lower parts that are symmetrical to each other, and the curvature of said outer curved surface of said lens module is discontinuous at a junction of said upper and lower parts of said lens module;
   whereby said source light beams provided by said light source unit are refracted by said lens module to result in change of traveling directions of said source light beams.

2. The direct type illuminating device as claimed in claim 1, wherein said lens module includes a plurality of lens plates that cooperate with each other to define a cavity for receiving said light source unit therein.

3. The direct type illuminating device as claimed in claim 1, wherein said lens module is spaced at an interval from said light source unit.

4. The direct type illuminating device as claimed in claim 1, wherein an inner curved surface of said lens module has a center of curvature which is coincident with that of said outer curved surface of said light source unit.

5. A direct type illuminating device comprising:
   a reflector plate;
   a diffuser plate spaced at an interval from said reflector plate;
   at least a light source unit providing source light beams and interposed between said reflector plate and said diffuser plate; and
   at least a lens module surrounding said light source unit and located between said reflector plate and said diffuser plate, an outer curved surface of said lens module having a plurality of different radiuses of curvature;
   wherein said lens module has left and right parts that are symmetrical to each other, and the curvature of said outer curved surface of said lens module is discontinuous at a junction of said left and right parts of said lens module;
   wherein said lens module has upper and lower parts that are symmetrical to each other, and the curvature of said outer curved surface of said lens module is discontinuous at a junction of said upper and lower parts of said lens module;
   whereby said source light beams provided by said light source unit are refracted by said lens module to result in change of traveling directions of said source light beams.

6. The direct type illuminating device as claimed in claim 5, wherein said lens module includes a plurality of lens plates that cooperate with each other to define a cavity for receiving said light source unit therein.

7. The direct type illuminating device as claimed in claim 5, wherein said lens module is spaced at an interval from said light source unit.

8. The direct type illuminating device as claimed in claim 5, wherein an inner curved surface of said lens module has a center of curvature which is coincident with that of said outer curved surface of said light source unit.

9. A direct type illuminating device comprising:
   a reflector plate;
   a diffuser plate spaced at an interval from said reflector plate;
   at least a light source unit providing source light beams and interposed between said reflector plate and said diffuser plate; and
   at least a lens module surrounding said light source unit and located between said reflector plate and said diffuser plate, said lens module having an outer curved surface with a center of curvature which is non-coincident with that of an outer curved surface of said light source unit;
   wherein said lens module has left and right parts that are symmetrical to each other, and the curvature of said outer curved surface of said lens module is discontinuous at a junction of said left and right parts of said lens module;
   wherein said lens module has upper and lower parts that are symmetrical to each other, and the curvature of said outer curved surface of said lens module is discontinuous at a junction of said upper and lower parts of said lens module;
   whereby said source light beams provided by said light source unit are refracted by said lens module to result in change of traveling directions of said source light beams.

10. The direct type illuminating device as claimed in claim 9, wherein said lens module includes a plurality of lens plates that cooperate with each other to define a cavity for receiving said light source unit therein.

11. The direct type illuminating device as claimed in claim 9, wherein said lens module is spaced at an interval from said light source unit.

12. The direct type illuminating device as claimed in claim 9, wherein an inner curved surface of said lens module has a center of curvature which is coincident with that of said outer curved surface of said light source unit.

* * * * *